United States Patent
Ogawa

(10) Patent No.: US 6,704,269 B1
(45) Date of Patent: Mar. 9, 2004

(54) OPTICAL DISK RECORDING APPARATUS

(75) Inventor: Atsushi Ogawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/328,773

(22) Filed: Jun. 9, 1999

(30) Foreign Application Priority Data

Jun. 17, 1998 (JP) .......................................... 10-186895

(51) Int. Cl.$^7$ ................................................. G11B 7/00
(52) U.S. Cl. .................. 369/116; 369/59.11; 369/47.37
(58) Field of Search ............................ 369/47.4, 53.37, 369/53.29, 116, 275.4, 275.3, 288, 53.3, 59.11, 44.34, 44.35, 47.51, 53.26, 59.12, 13.26, 13.27

(56) References Cited

U.S. PATENT DOCUMENTS

| | | | | |
|---|---|---|---|---|
| 5,118,541 A | * | 6/1992 | Yamamoto et al. | 369/288 |
| 5,412,626 A | * | 5/1995 | Ohno et al. | 369/100 |
| 5,502,702 A | * | 3/1996 | Nakajo | 369/116 |
| 5,550,799 A | * | 8/1996 | Inoue et al. | 369/116 |
| 5,608,711 A | * | 3/1997 | Browne et al. | 369/116 |
| 5,663,941 A | * | 9/1997 | Aoshima | 369/44.34 |
| 5,848,043 A | * | 12/1998 | Takada et al. | 369/116 |
| 5,930,227 A | * | 7/1999 | Fujimoto et al. | 369/275.3 |
| 5,956,308 A | * | 9/1999 | Akahira et al. | 369/47.4 |
| 5,974,021 A | * | 10/1999 | Toda et al. | 369/116 |

* cited by examiner

*Primary Examiner*—Paul W. Huber
*Assistant Examiner*—Kim-Kwok Chu
(74) *Attorney, Agent, or Firm*—Pillsbury Winthrop LLP

(57) ABSTRACT

In accordance with a length of a pit to be recorded, a laser power irradiation time is controlled to have a length of $(n-K)T + \Delta 3T$, where nT represents the length of a pit to be formed, K is a constant and $\Delta 3T$ represents an extra laser power value for addition to recording of a 3T pit. The control section also performs control for imparting an additional top power pulse to an initial part of each pit-forming laser power irradiation so as to increase a level of the laser power over a standard recording power level temporarily for a predetermined time period during the irradiation. The K and $\Delta 3T$ values and the level of the additional top power pulse are optimized for each selected recording speed. This arrangement always achieves optimum reproductive characteristics of signals recorded on cyanine-based or phthalocyanine-based optical disks at any selected recording speeds.

7 Claims, 13 Drawing Sheets

OPTICAL DISK RECORDING APPARATUS

BACKGROUND OF THE INVENTION

The present invention relates generally to optical disk recording apparatus based on a mark-length recording scheme which irradiates a laser light beam onto a recording surface of an optical disk to form pits therein for desired information recording. More particularly, the present invention relates an improved optical disk recording apparatus which provides for improved reproductive characteristics, such as less jitter, less deviations from predetermined pit or land lengths and a lower error rate, of signals recorded on cyanine-based and phthalocyanine-based optical disks at various recording speeds.

Among various known standards for writable optical disks is the CD-WO (CD Write Once) standard that is commonly known as the "Orange Book". According to a recording strategy based on this CD-WO standard or Orange Book, a laser-light irradiation time for forming pits (i.e., recording-laser-power irradiation time) is set to the following length, for both the standard and double recording speeds, irrespective of which kind of dye material is used in the recording layer of the optical disk:

$$(n-1)T+\Delta 3T$$

where "nT" represents a length of a pit to be formed with "n" being a variable in the range of 3–11, and "Δ3T" is an extra laser power value for addition to recording of a shortest 3T pit.

In this CD-WO standard, a target pit depth parameter $\beta$ is also defined for a target pit depth of a pit to be formed. Specifically, this target pit depth parameter $\beta$ is defined as a ratio between positive (plus-side) and negative (minus-side) peak values A1 and A2 of a signal (high frequency or HF signal) read out from the optical disk and having its d.c. component removed therefrom, as represented by $$\beta=(A1+A2)/(A1-A2)$$

At a same recording speed, the target pit depth parameter $\beta$ becomes greater in value as the recording power increases but becomes smaller as the recording power decreases. Further, to keep the target pit depth parameter $\beta$ constant in a situation where the recording speed is varied, it is necessary to increase the recording laser power as the recording speed is increased. According to the Orange Book standard, the target pit depth parameter $\beta$ is prescribed to be fixed between 0% and 8% for every selected recording speed; that is, a particular recording laser power level is set depending on each selected recording speed so that the value of the target pit depth parameter $\beta$ always falls between 0% and 8% irrespective of the selected recording speed.

Further, in Japanese Patent Application No. HEI-8-233596 filed by the same assignee of the instant application, there is disclosed a recording strategy in accordance with which the laser-light irradiation time is set to a length of $$(n-K)T+\alpha(nT)-\beta(mT)$$

, where "K" is a constant,

α(nT) represents a modification amount per pit length —for example, a relationship of $\alpha(3T) \geq \alpha(4T) \geq \alpha(5T) \geq \ldots \geq \alpha(8T)$ and hence $(\alpha(3T) > \alpha(8T))$ may be applied—, and β(mT) represents a modification amount per immediately preceding land length which is a parameter unrelated to the target pit depth parameter α—at least, a relationship of $\beta(3T) \geq \beta(4T) \geq \beta(5T) \geq \ldots \geq \beta(8T)$ and hence $(\beta(3T) > \beta(8T))$ maybe applied—. In this case, the constant K is set to be between 0T and 0.5T for a six-times recording speed and between 0T and 0.3T for an eight-times recording speed, regardless of the kind of dye material used in the optical disk's recording layer.

However, the recorded conditions of the optical disk would considerable vary depending on the selected dye material and recording speed, so that the standardized laser-irradiation time control based on the Orange Book could not achieve optimum reproductive characteristics of the recorded signals. Further, with the target pit depth parameter $\beta$ fixed between 0% and 8% irrespective of the variably selected recording speed as noted above, the reproduced signals would become more likely to have an unwanted waveform distortion as the recording speed is increased, which would substantially deteriorate the reproductive characteristics of the signals. Further, for some types of disks, the recording strategy disclosed in Japanese Patent Application No. HEI-8-239396 could not necessarily attain optimum reproductive characteristics of the recorded signals.

SUMMARY OF THE INVENTION

It is therefore an object of the present invention to provide an optical disk recording apparatus which can record signals on an optical disk in such a way that optimum reproductive characteristics of the recorded signals are always achieved for any kinds of dye material used in the disk's recording layer and for any selected recording speeds.

In order to accomplish the above-mentioned object, the present invention provides an optical disk recording device which, in accordance with a length of a pit to be recorded, a laser power irradiation time is controlled to take a length of (n−K)T+Δ3T, where nT represents the length of a pit to be formed, K is a constant and Δ3T represents an extra laser power value for addition to recording of a 3T pit. The control section also performs control for imparting an additional top power pulse to an initial part of each pit-forming laser power irradiation so as to increase the laser power level over a standard recording power level temporarily for a predetermined time period. The K and Δ3T values and the level of the additional top power pulse are optimized in the present invention in accordance with a combination of the disk type and the recording speed. This arrangement always achieves optimum reproductive characteristics of signals recorded on cyanine-based and phthalocyanine-based optical disks at any recording speeds.

Further, the present invention provides an optical disk recording apparatus capable of recording on both a cyanine-based optical disk and a phthalocyanine-based optical disk at a variably selected recording speed, which comprises a control section that controls a recording laser power level in such a manner that a target pit depth parameter, related to a target value of a pit depth to be formed in the optical disk, is made smaller in value as the recording speed is increased. With this arrangement, even signals recorded at a relatively high recording speed can be reproduced with improved reproductive characteristics with the possibility of an unwanted waveform distortion effectively minimized.

Recording on the optical disk while controlling the recording laser power level in such a manner that the target pit depth parameter is made smaller in value as the recording speed is increased may be realized in the following manner. Namely, optimum target pit depth parameter values, which become smaller in value as the recording speed is increased, are determined previously, and the thus-determined optimum target pit depth value for each of the recording speeds is prestored into memory as a target pit depth value. Then, after selection of a desired recording speed, trial recording is performed under the optimum power control (OPC) as prescribed by the Orange Book standard, so that a recording laser power level achieving the target pit depth value predetermined for the selected recording speed is automatically determined and prestored into memory as a target recording laser power value. Actual recording on the optical disk can be carried out at that selected recording speed while controlling the actual recording laser power level in accordance with the prestored target recording laser power value.

In a similar manner to the conventional counterpart, the OPC control in this instance automatically performs a series of operations of: carrying out trial recording on the power calibration area (PCA) located inwardly of the lead-in area of the optical disk while variously changing the recording laser power level with the recording speed kept constant; reproducing the thus-recorded signal; removing a d.c. component from the reproduced high-frequency (HF) signal by means of a high-pass filter; detecting positive (plus-side) and negative (minus-side) peak values of the reproduced signal; calculating a ratio between a sum and a difference between these two peak values to thereby determine a target pit depth for each of the recording laser power levels; comparing the calculated target pit depth to a target pit depth value preset for that recording speed so as to find a particular recording laser power level capable of achieving a calculated target pit depth closest to the preset target pit depth value; and storing the particular recording laser power level as a target recording laser power value.

As another approach for recording on the optical disk while controlling the recording laser power level in such a manner that the target pit depth parameter is made smaller in value as the recording speed is increased, the following operations may be carried out. Namely, in stead of the optical disk recording apparatus itself performing the OPC control, a recording laser power level achieving an optimum target pit depth value, which is made smaller in value as the recording speed is increased, is determined previously for each disk type (such as for each dye material used in the disk's recording layer, disk manufacturer, etc.) and prestored into memory of the optical disk recording apparatus. Then, in recording, the optical disk recording apparatus identifies the type of the optical disk installed therein from, for example, a disk ID registered in the disk and reads out a particular one of the prestored recording laser power levels in accordance with the identified disk type and selected recording speed, to thereby carry out the actual recording while controlling the actual recording laser power level in accordance with the read-out prestored recording laser power level.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 2:
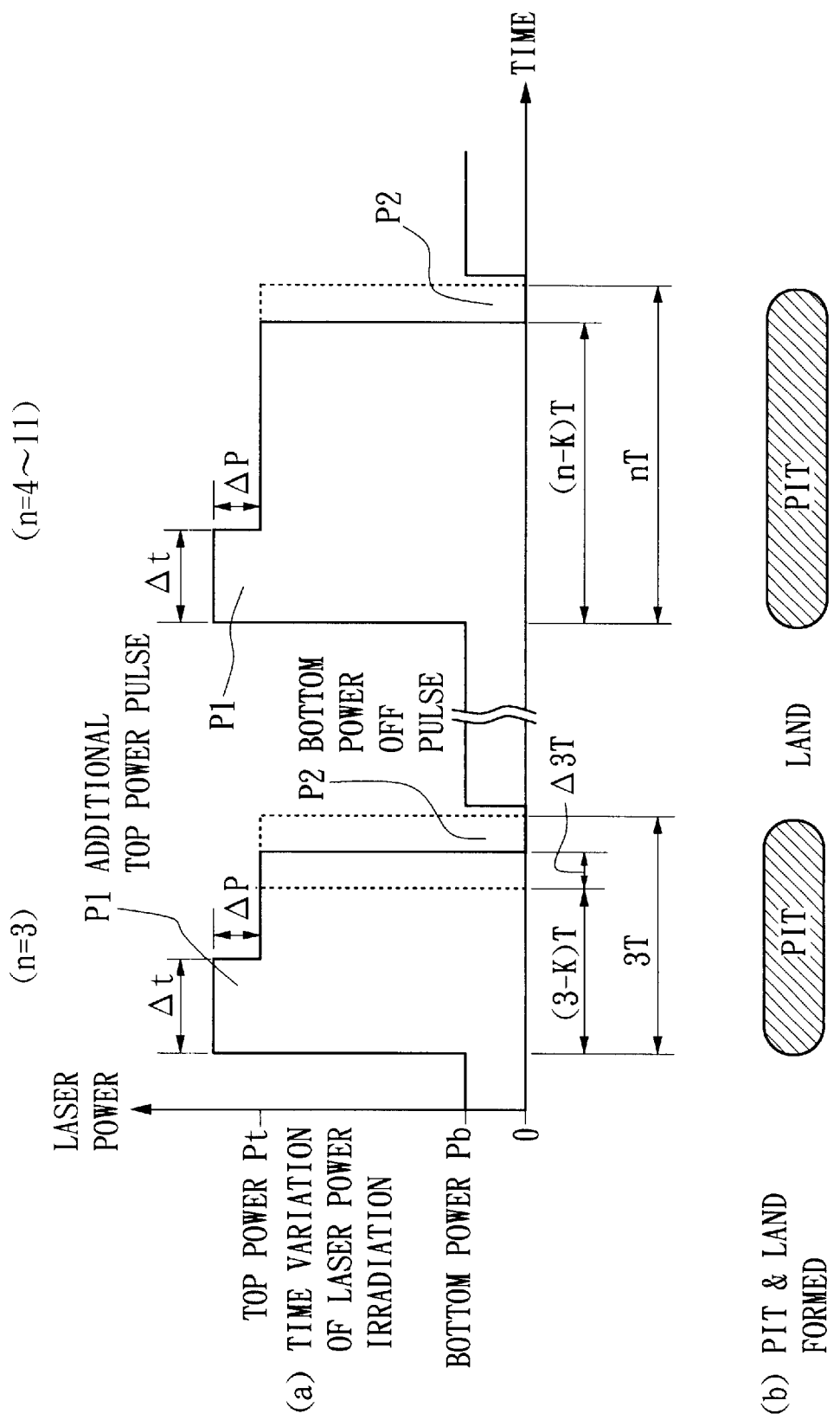
FIG. 2 is a waveform diagram showing an exemplary time variation of recording-laser-power irradiation in the present invention.

In FIG. 2, there is shown an exemplary time variation of recording-laser-power irradiation in a preferred embodiment of the present invention. Here, the laser light irradiation time is controlled as follows in accordance with lengths of pits nT (n=3, 4, . . . , 11) to be formed in an optical disk:

$$(n-K)T+\Delta 3T$$

, where "K" is a constant "nT" represents a length of a pit to be formed and "Δ3T" is an extra laser power value for addition to recording of a 3T pit. Also, in this example, laser power control is performed such that for a predetermined recording speed (i.e., a speed at which a ΔP value, to be described later in relation to Table 1–Table 5, is other than 0%), an additional top power pulse is imparted to an initial part of each pit-forming or recording laser power irradiation so as to increase the recording laser power over a standard recording power level temporarily for a predetermined time period. Namely, when n=3, the laser power is raised to a top power level Pt for a time period of "(3−K)T +Δ3T" so as to form a desired 3T pit, and when n is any one of the other values in the range of 4 to 11, the laser power is raised to a maximum or top power level Pt for a time period of "(n−K)T" so as to form a pit having any one of 4T–11T lengths. For each segment between the pit-forming segments, the laser power is lowered to a minimum or bottom power level Pb for forming a land. More specifically, at the beginning or initial part of the top power level irradiation Pt, the additional top power pulse P1, having a level of ΔP and a width of Δt, is added to finely adjust the laser power radiation (energy increase) and thereby finely adjust a trailing end position of the pit. Further, a bottom-power-OFF pulse P2, having a zero level and an appropriate width, is applied at the end of the top-power-level irradiation Pt, as necessary, to finely adjust the laser power radiation (energy decrease) and thereby finely adjust a trailing end position of the land (i.e., a leading end position of a next pit).

FIGS. 3 to 11 show various reproductive characteristics of signals recorded on cyanine-based and phthalocyanine-based optical disks at various recording speeds by use of the laser power control of FIG. 2 while variously changing the K, Δ3T and ΔP values. In these cases, the width Δt of the additional top power pulse P1 was fixedly set to 1.25T for every pit length at every recording speed, and no bottom-power-OFF pulse P2 was added (i.e., the fixed bottom power level Pb was used for the whole of every land-forming segment). According to the Orange Book standard, it is required that, with the target pit depth parameter β set to within the range of 0% to 8%, the jitter for each 3T pit and 3T land fall below 35 nsec. and the deviation for each 11T pit fall below ±60 nsec. The following paragraphs consider such K, Δ3T and ΔP values that meet these requirements.

Figure 3:
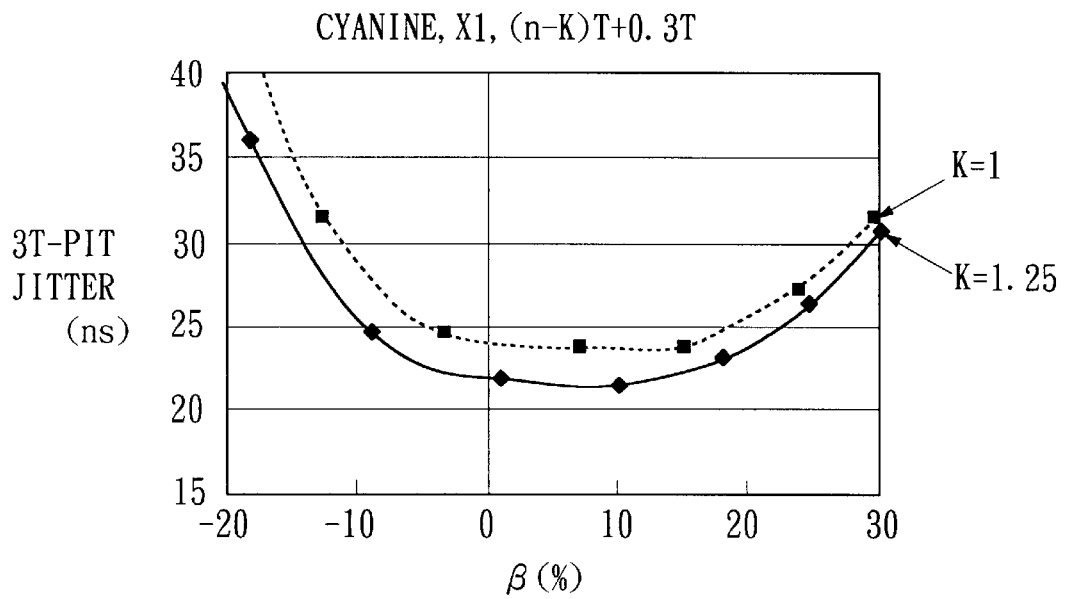
FIG. 3 is a graph illustrating 3T-pit jitter characteristics observed in reproduction of signals recorded on a cyanine-based optical disk at a standard ("one-time" or non-multiplied) recording speed.
Figure 4:
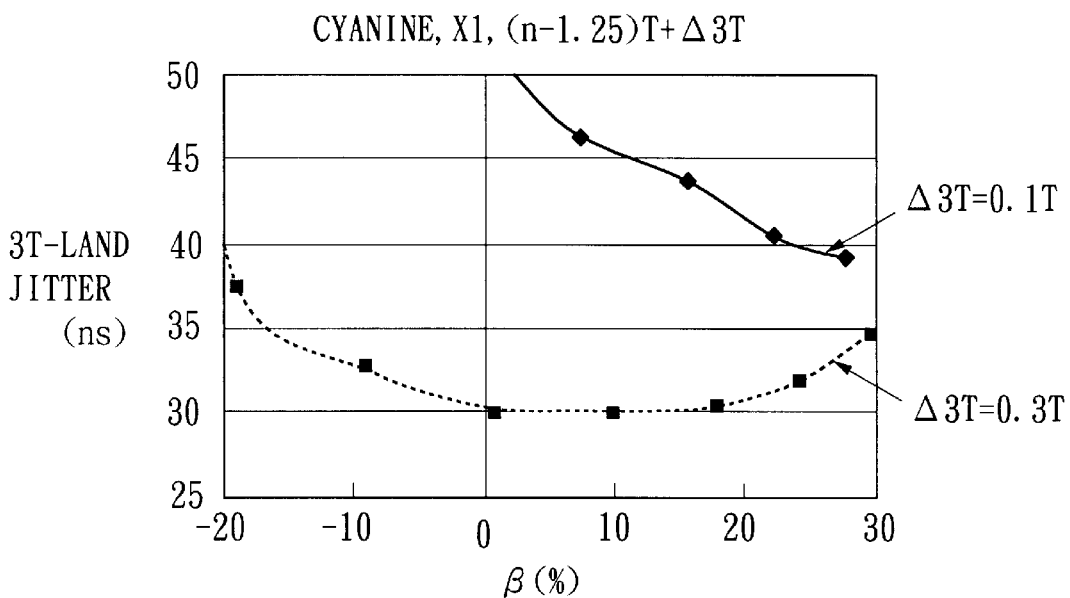
FIG. 4 is a graph illustrating 3T-land jitter characteristics observed in reproduction of signals recorded on the cyanine-based optical disk at the standard recording speed.

(1) Standard Speed Recording:

FIG. 3 is a graph illustrating 3T-pit jitter characteristics observed in reproduction of signals recorded on the cyanine-based optical disk at the standard ("one-time" or non-multiplied) recording speed while changing the K value with the Δ3T value fixed set to "0.3T". From this graph, it is seen that the pit jitter characteristics can be improved by setting a K value greater than "1". Thus, recording was then performed on the same optical disk at the standard recording speed while changing the Δ3T value with the K value set to "1.25", which achieved 3T-land jitter characteristics of FIG. 4. In the case of FIG. 4, the land jitter characteristics were improved to provide for a wider power margin, by setting the Δ3T value to "0.3T".

Figure 5:
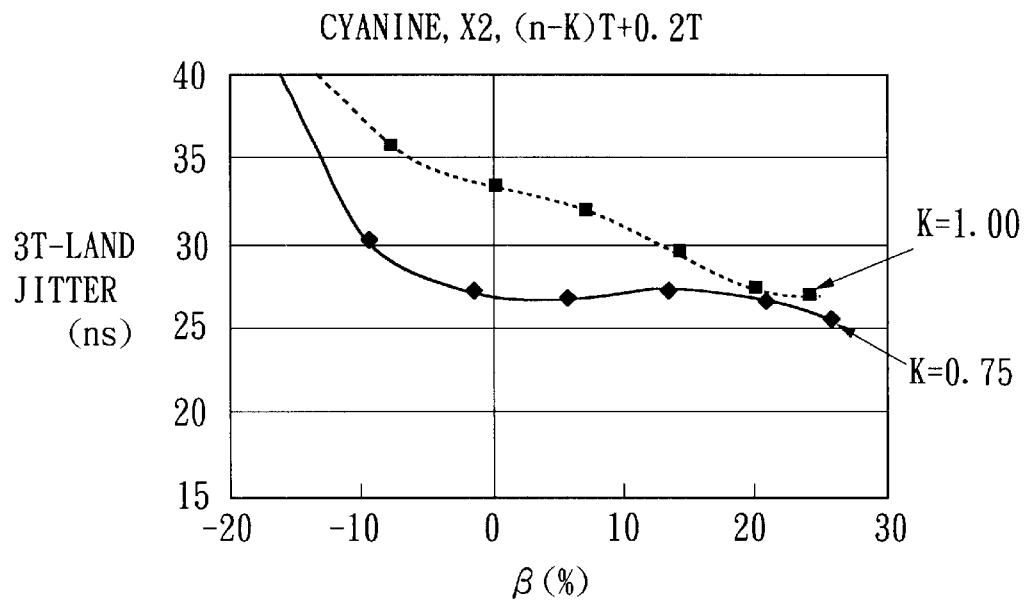
FIG. 5 is a graph illustrating 3T-land jitter characteristics observed in reproduction of signals recorded on the cyanine-based optical disk at a double or two-times recording speed.
Figure 6:
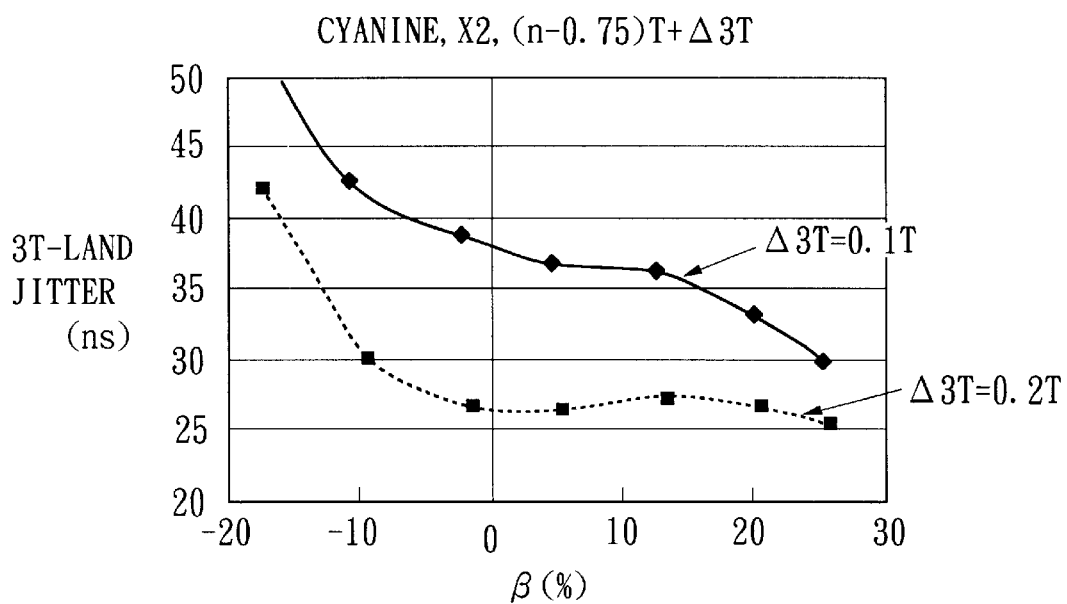
FIG. 6 is a graph illustrating 3T-land jitter characteristics observed in reproduction of signals recorded on the cyanine-based optical disk at the double recording speed.

(2) Double Speed Recording:

FIG. 5 is a graph illustrating 3T-land jitter characteristics observed in reproduction of signals recorded on the cyanine-based optical disk at the two-times or double recording speed while changing the K value with the Δ3T value set to "0.2T". From this graph, it is seen that the land jitter characteristics can be improved to provide for a wider power margin by setting a K value smaller than "1". Thus, recording was then performed on the same optical disk at the double recording speed while changing the Δ3T value with the K value set at "0.75", which achieved 3T-land jitter characteristics of FIG. 6. In the case of FIG. 6, the land jitter characteristics were improved to provided for a greater power margin, by setting the Δ3T value to "0.2T".

Figure 7:
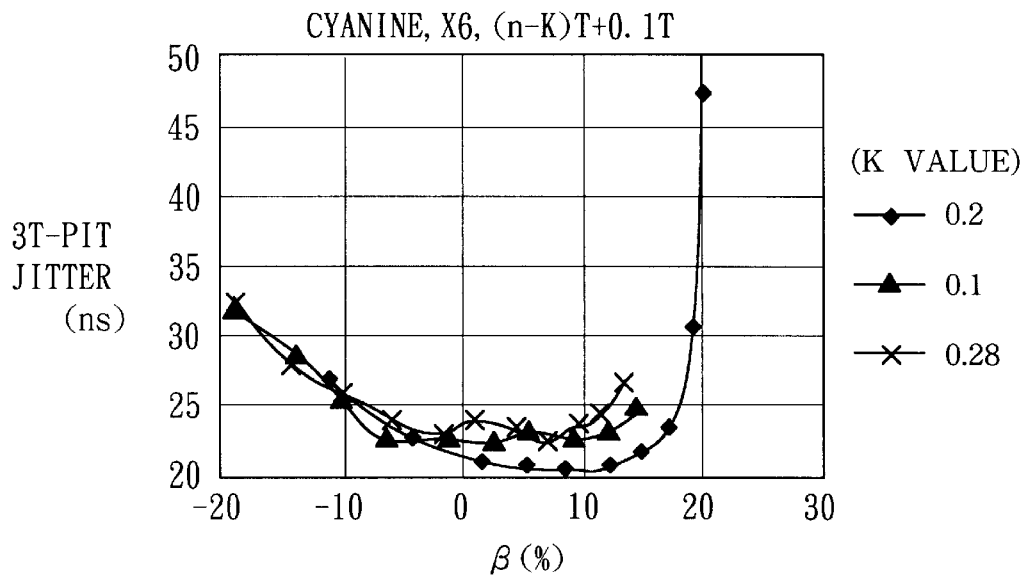
FIG. 7 is a graph illustrating 3T-pit jitter characteristics observed in reproduction of signals recorded on the cyanine-based optical disk at a six-times recording.
Figure 8:
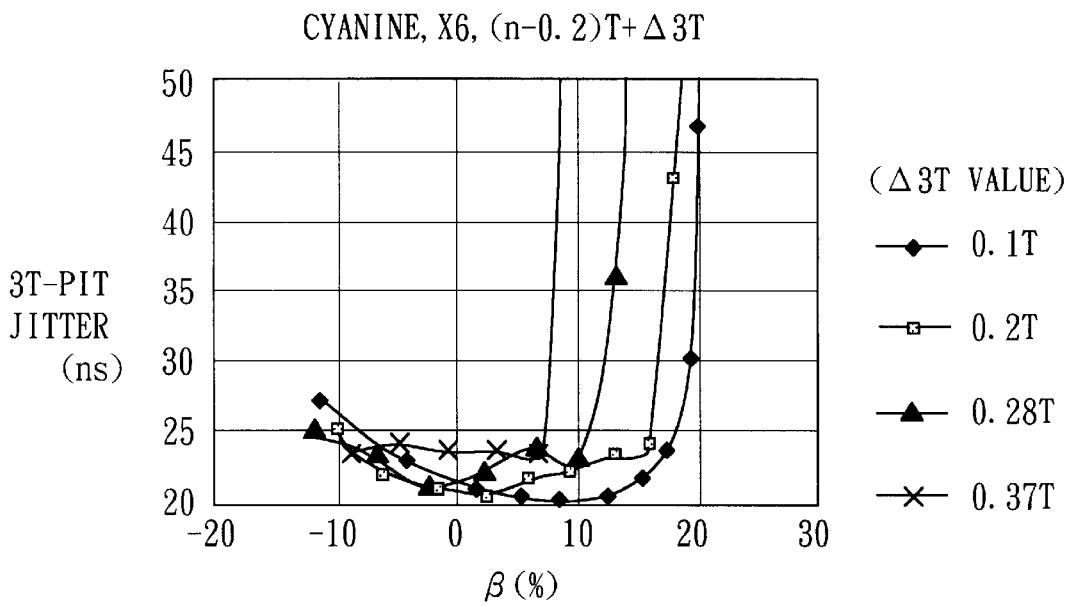
FIG. 8 is a graph illustrating 3T-pit jitter characteristics observed in reproduction of signals recorded on the cyanine-based optical disk at the six-times recording.

(3) Six-times Speed Recording:

FIG. 7 is a graph illustrating 3T-pit jitter characteristics observed in reproduction of signals recorded on the cyanine-based optical disk at the six-times recording speed while changing the K value with the Δ3T value set to "0.1T". From this graph, it is seen that the pit jitter characteristics can be improved for a wider power margin by setting the K value to "0.2". Thus, recording was then performed on the same optical disk at the six-times recording speed while changing the Δ3T value with the K value set at "0.2", which achieved 3T-pit jitter characteristics of FIG. 8. In the case of FIG. 8, the pit jitter characteristics were improved to provide for a greater power margin, by setting the Δ3T value to "0.1T.

Figure 9:
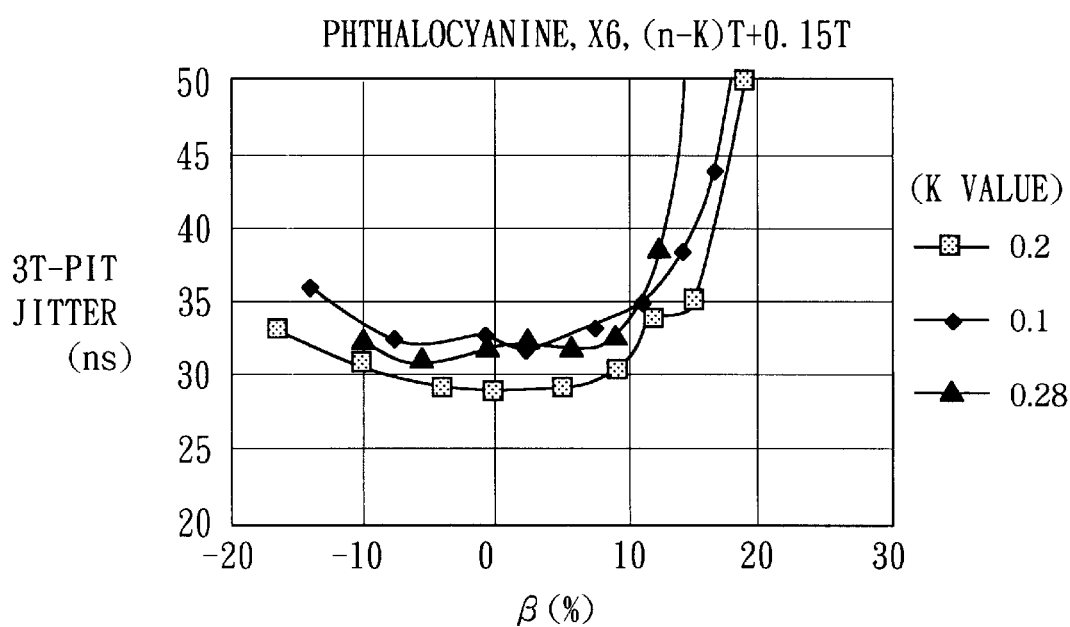
FIG. 9 is a graph illustrating 3T-pit jitter characteristics observed in reproduction of signals recorded on a phthalocyanine-based optical disk at the six-times recording.
Figure 10:
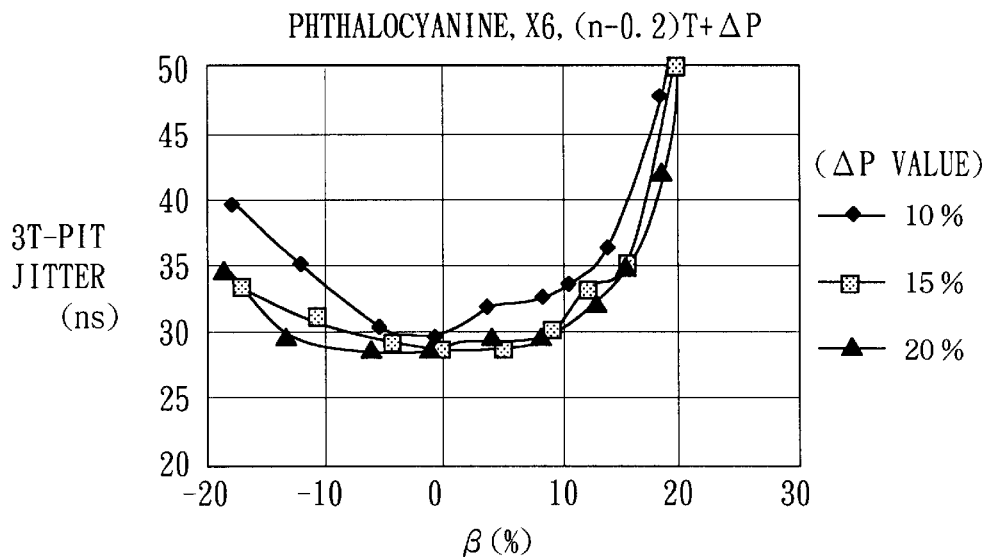
FIG. 10 is a graph illustrating 3T-pit jitter characteristics observed in reproduction of signals recorded on the phthalocyanine-based optical disk at the six-times recording.
Figure 11:
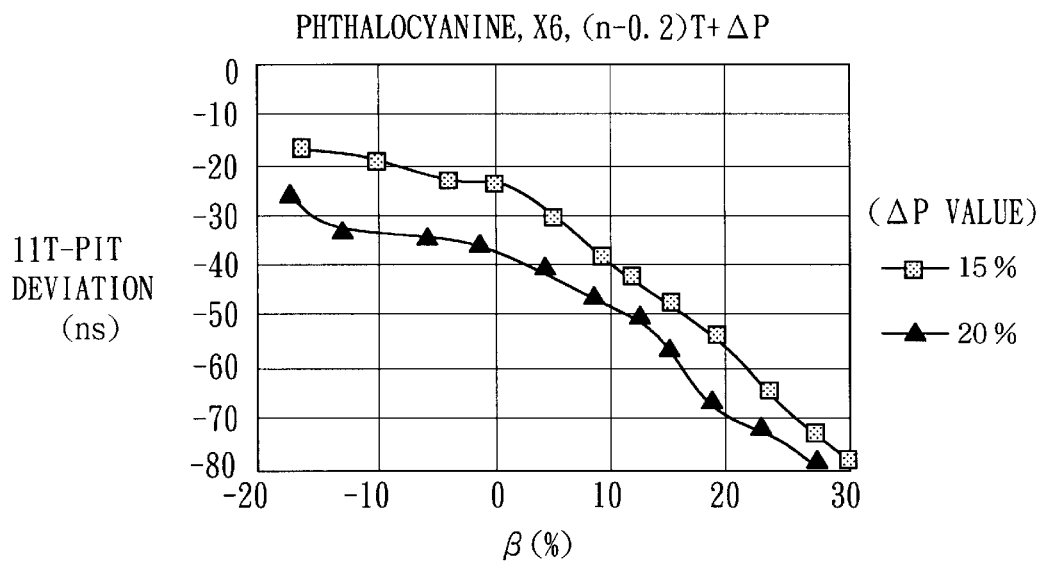
FIG. 11 is a graph illustrating 11T-pit deviation characteristics observed in reproduction of signals recorded on the phthalocyanine-based optical disk at the six-times recording.

Further, FIG. 9 is a graph illustrating 3T-pit jitter characteristics observed in reproduction of signals recorded on the phthalocyanine-based optical disk at the six-times recording speed while changing the K value with the Δ3T value set to "0.15T". From this graph, it is seen that the pit jitter characteristics can be improved for a wider power margin by setting the K value to "0.2". Thus, recording was then performed on the same optical disk at the six-times recording speed while changing the ΔP value with the K value set at "0.2", which achieved 3T-pit jitter characteristics of FIG. 10 and 11T-pit deviation characteristics of FIG. 11. A substantially same power margin is attained by the ΔP value of 15% and the ΔP value of 20%—the percentage represents a ratio to the difference "(Pt—Pb)" of FIG. 2—as shown in FIG. 10, but FIG. 11 indicates that the ΔP value of 15% attains better 11T-pit deviation characteristics; thus, it can be said that the ΔP value of 15% is preferable to the ΔP value of 20%.

Figure 12:
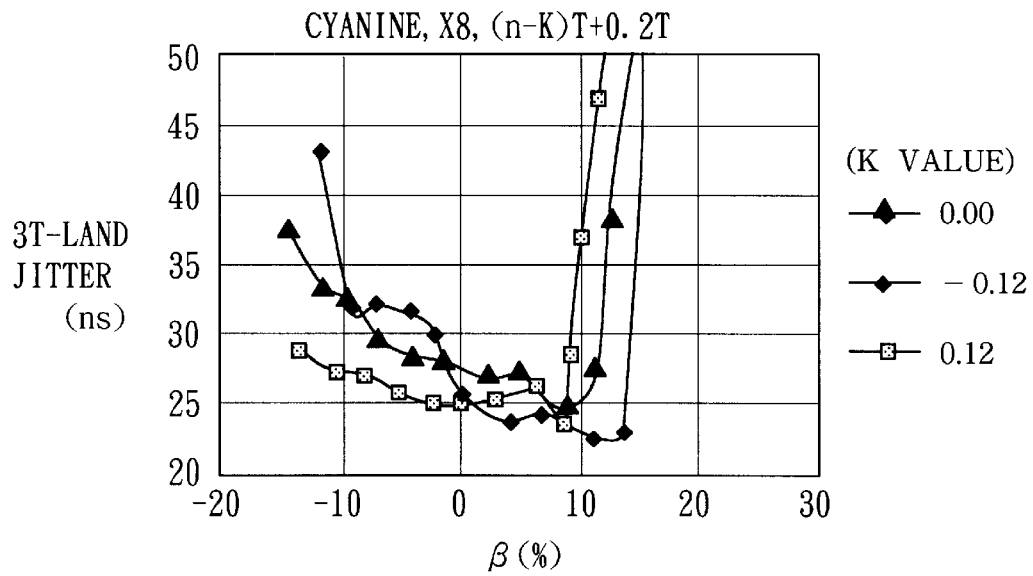
FIG. 12 is a graph illustrating 3T-land jitter characteristics observed in reproduction of signals recorded on the cyanine-based optical disk at an eight-times recording.
Figure 13:
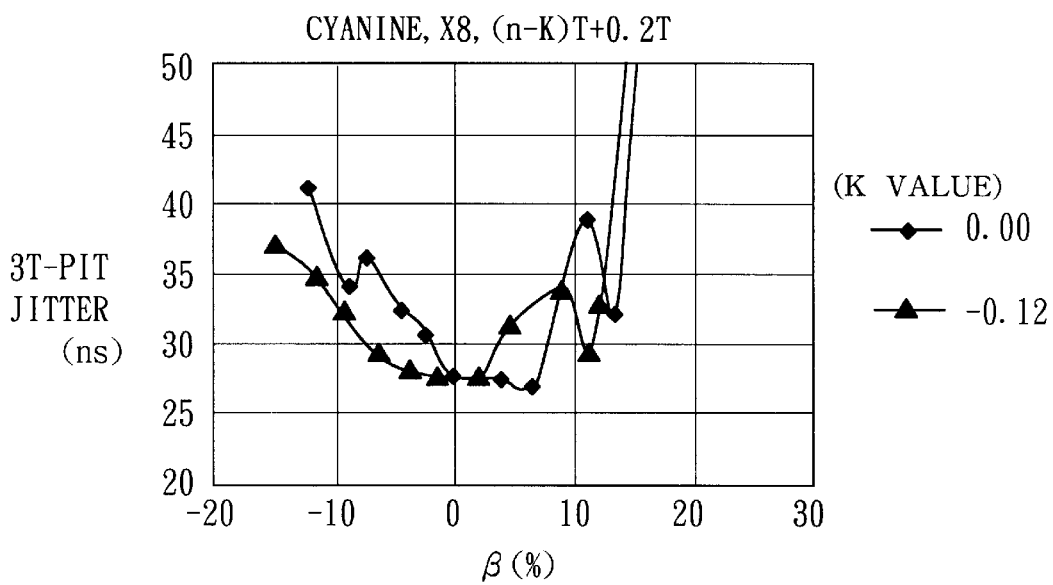
FIG. 13 is a graph illustrating 3T-pit jitter characteristics observed in reproduction of signals recorded on the cyanine-based optical disk at the eight-times recording.
Figure 14:
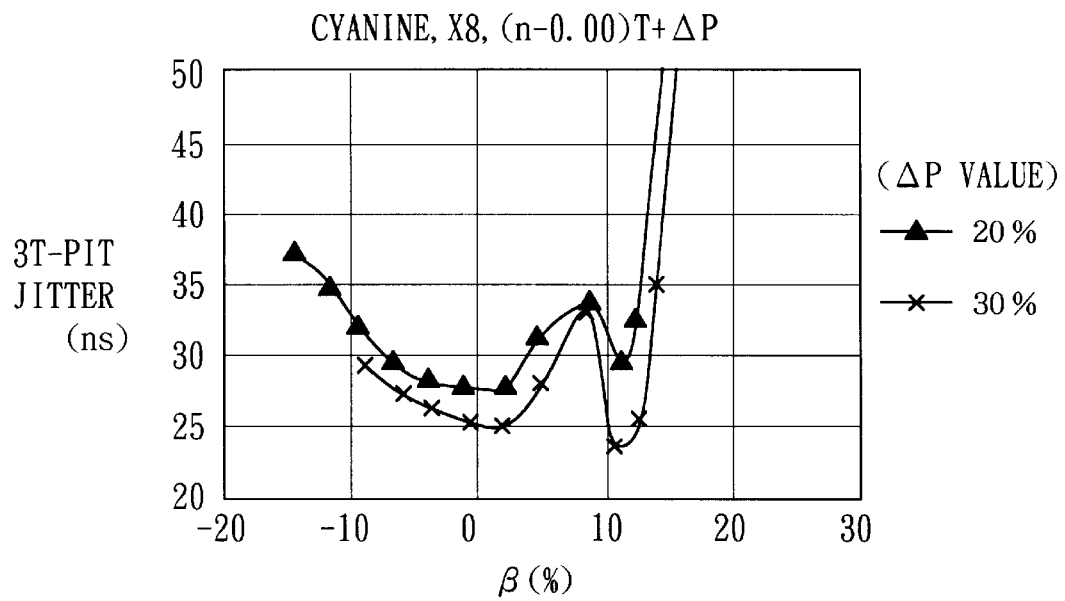
FIG. 14 is a graph illustrating 3T-pit jitter characteristics observed in reproduction of signals recorded on the cyanine-based optical disk at the eight-times recording.
Figure 15:
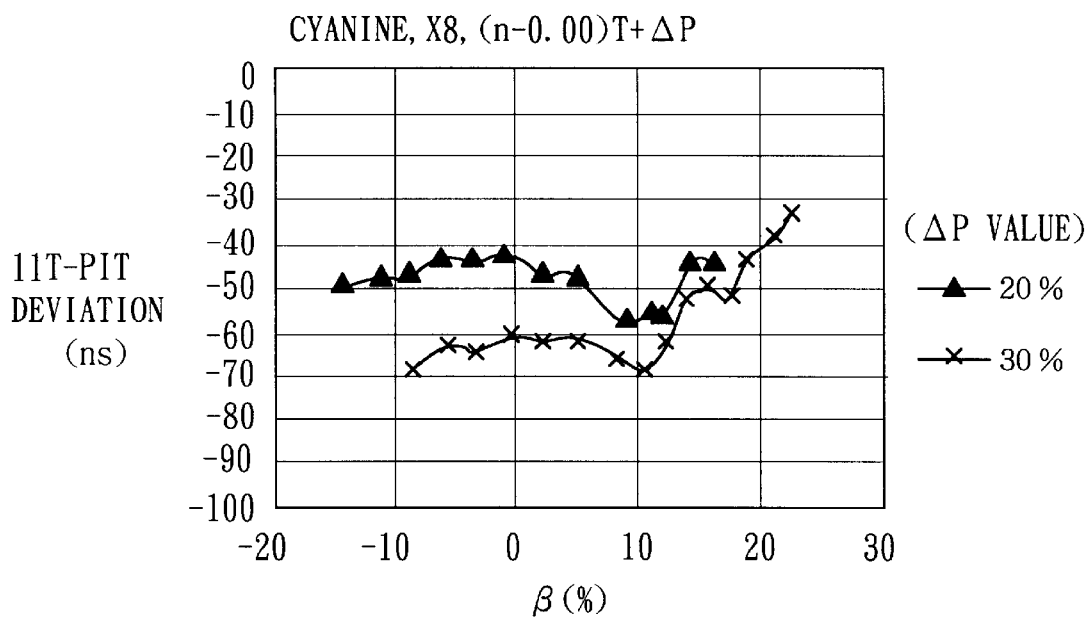
FIG. 15 is a graph illustrating 11T-pit deviation characteristics observed in reproduction of signals recorded on the cyanine-based optical disk at the eight-times recording.

(4) Eight-times Speed Recording:

FIGS. 12 and 13 are graphs illustrating 3T-land jitter characteristics 3T-pit jitter characteristics, respectively, observed in reproduction of signals recorded on the cyanine-based optical disk at the eight-times recording speed while changing the K value with the Δ3T value set to "0.2T". From the land jitter characteristics graph of FIG. 12, it is seen that the land jitter starts occurring earlier when the K value is set to "0.00" than when the K value is "−0.12" and the power margin in the former case is narrower than in the latter case. For the 3T-pit jitter characteristics, however, the K value of "0.00" can be said to be preferable to the K value of "−0.12" in that it attains a wider power margin as seen from FIG. 13. Thus, recording was then performed on the same optical disk at the eight-times recording speed while changing the ΔP value with the K value set at "0.00", which achieved 3T-pit jitter characteristics of FIG. 14 and 11T-pit deviation characteristics of FIG. 15. The ΔP value of 30% attained better pit jitter characteristics than those attained by the ΔP value of 20% as seen from FIG. 14 but it could not meet the 11T-pit deviation requirement; therefore, the ΔP value of 20% can be said to be more appropriate.

Figure 16:
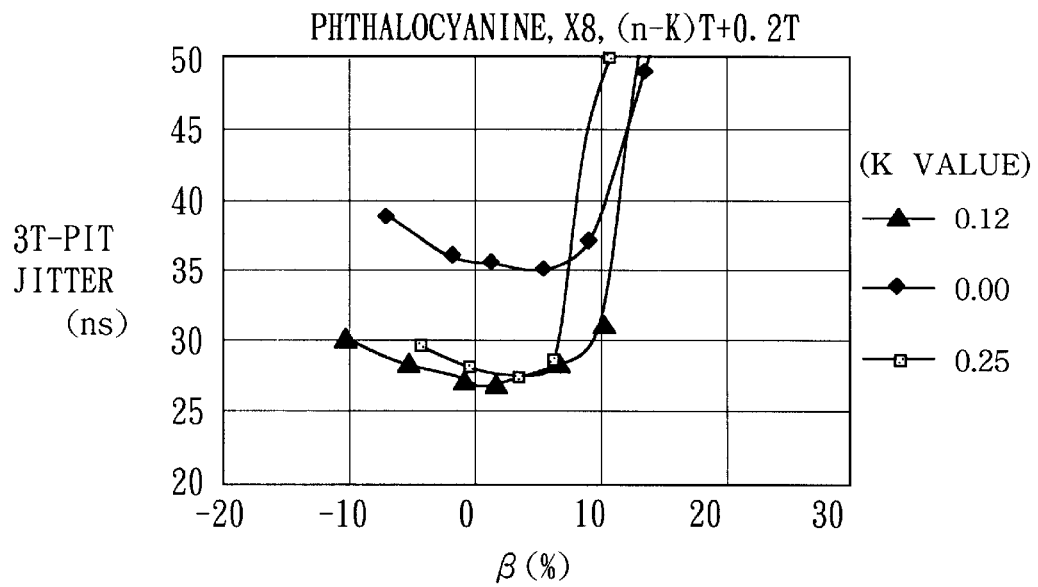
FIG. 16 is a graph illustrating 3T-pit jitter characteristics observed in reproduction of signals recorded on the phthalocyanine-based optical disk at the eight-times recording.
Figure 17:
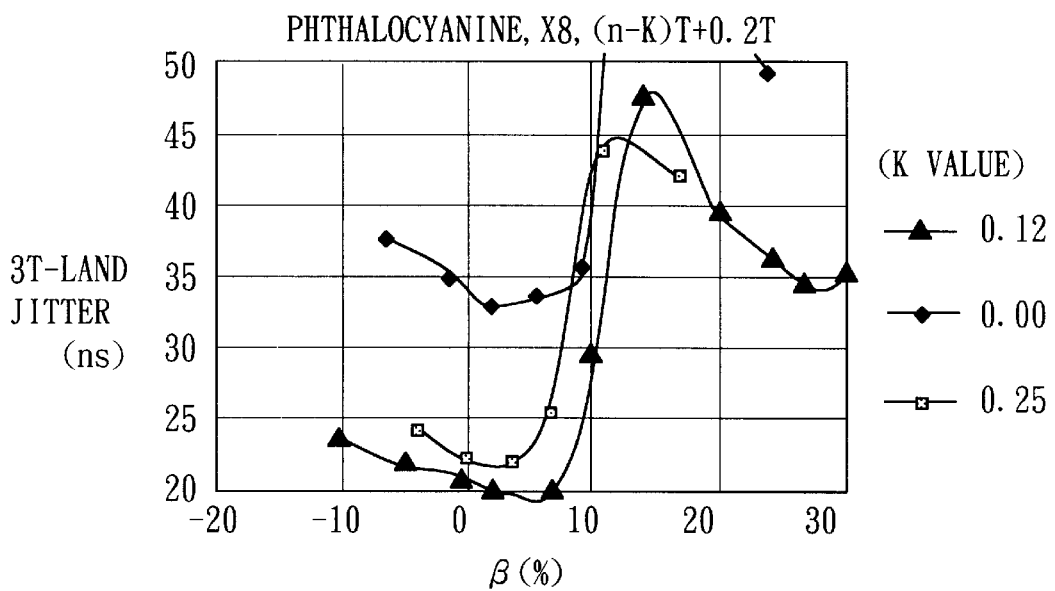
FIG. 17 is a graph illustrating 3T-land jitter characteristics observed in reproduction of signals recorded on the phthalocyanine-based optical disk at the eight-times recording.
Figure 18:
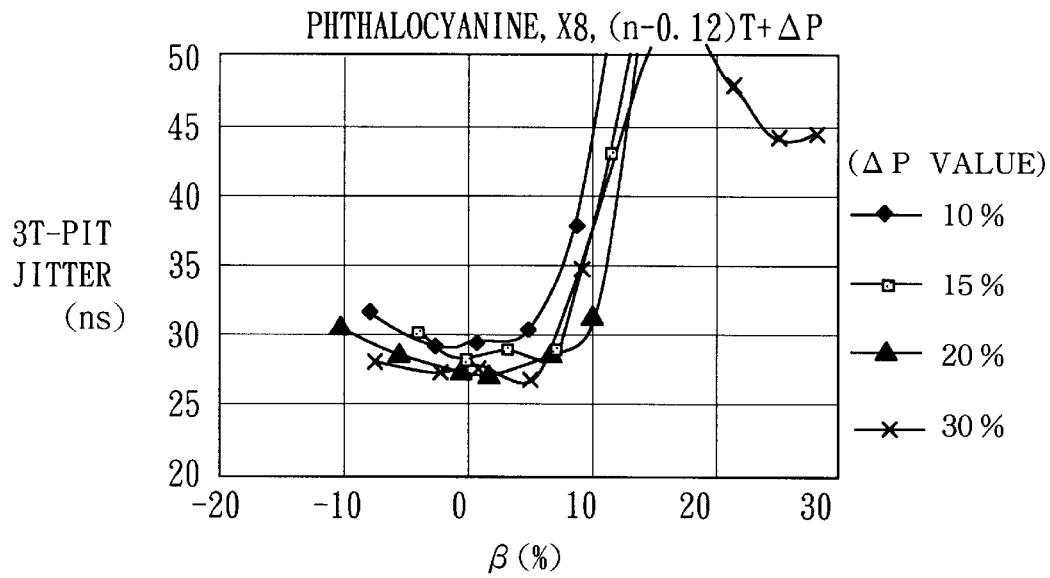
FIG. 18 is a graph illustrating 3T-pit jitter characteristics observed in reproduction of signals recorded on the phthalocyanine-based optical disk at the eight-times recording.
Figure 19:
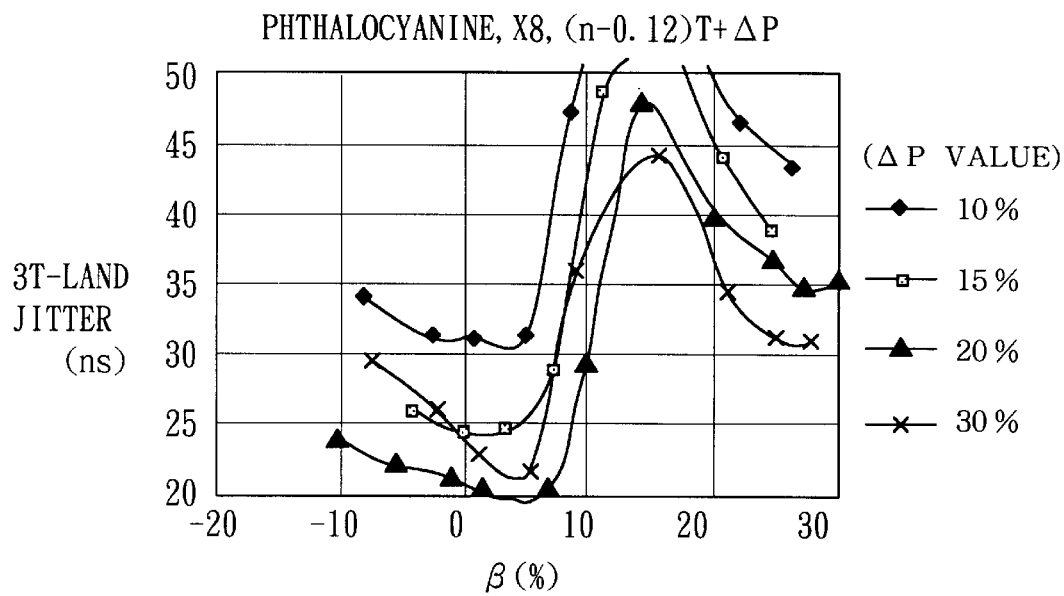
FIG. 19 is a graph illustrating 3T-land jitter characteristics observed in reproduction of signals recorded on the phthalocyanine-based optical disk at the eight-times recording.

Further, FIGS. 16 and 17 are graphs illustrating 3T-pit jitter characteristics and 3T-land jitter characteristics, respectively, observed in reproduction of signals recorded on the phthalocyanine-based optical disk at the eight-times recording speed while changing the K value with the Δ3T value set to "0.2T". It was found that the pit jitter characteristics and land jitter characteristics could be both improved with the Δ3T value set at "0.12T". Thus, recording was then performed on the same optical disk at the eight-times recording speed while changing the ΔP value with the K value set at "0.12", which achieved 3T-pit jitter characteristics of FIG. 18 and 3T-land characteristics of FIG. 19. From the graphs of FIGS. 18 and 19, the power margin could be increased considerably when the ΔP value was set to "20%".

Further, optimum ranges of the K, Δ3T and ΔP values of the cyanine-based and phthalocyanine-based optical disks were determined, as shown in Tables 1–5 below, for each of the recording speeds in consideration of the foregoing experiment results and various other characteristics such as error rates including C1 error rates. Here, the ΔP value range was determined in relation to the pulse width Δt of 1.25T. When the pulse width Δt is not 1.25T, the ΔP value is set such that substantially the same laser light power irradiation is achieved as when the pulse width Δt is 1.25T; that is, the A P value is made smaller as the pulse width Δt is increased but is made greater as the pulse width Δt is decreased.

TABLE 1

| STANDARD SPEED | K VALUE | Δ3T VALUE | ΔP VALUE |
|---|---|---|---|
| CYANINE | 1.0~1.4 | 0.25T~0.35T | 0% |
| PHTHALOCYANINE | 0.8~1.2 | 0.05T~0.15T | 0% |

TABLE 2

| DOUBLE SPEED | K VALUE | Δ3T VALUE | ΔP VALUE |
|---|---|---|---|
| CYANINE | 0.6~0.9 | 0.15T~0.25T | 0% |
| PHTHALOCYANINE | 0.8~1.2 | 0.10T~0.20T | 0% |

TABLE 3

| FOUR-TIMES SPEED | K VALUE | Δ3T VALUE | ΔP VALUE |
|---|---|---|---|
| CYANINE | 0.3~0.6 | 0T | 25~35% |
| PHTHALOCYANINE | 0.3~0.6 | 0T | 15~25% |

TABLE 4

| SIX-TIMES SPEED | K VALUE | Δ3T VALUE | ΔP VALUE |
|---|---|---|---|
| CYANINE | 0.1~0.25 | 0.05T~0.15T | 0% |
| PHTHALOCYANINE | 0.1~0.25 | 0T | 10~20% |

TABLE 5

| EIGHT-TIMES SPEED | K VALUE | Δ3T VALUE | ΔP VALUE |
|---|---|---|---|
| CYANINE | −1.0~0.1 | 0T | 15~25% |
| PHTHALOCYANINE | 0.0~0.2 | 0T | 15~25% |

Figure 20:
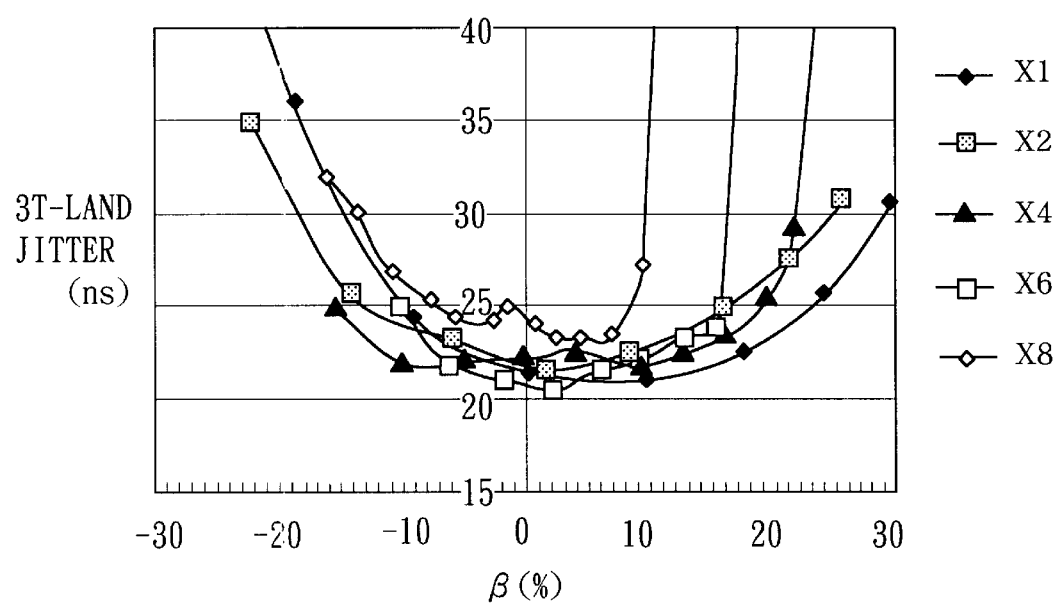
FIG. 20 is a graph illustrating 3T-land jitter characteristics observed in reproduction of signals recorded on the cyanine-based optical disk at the various recording speeds while changing a target pit depth value.

According to these tables, the K value can be approximated by the following equations if the selected recording speed is represented by "x":

for the Cyanine-based disk, $K=-0.16x+1.2$ for the Phthalocyanine-based disk, $K=-0.15x+1.15$ FIG. 20 is a graph illustrating 3T-land jitter characteristics observed in reproduction of signals recorded on the cyanine-based optical disk at the various recording speeds while changing the target pit depth parameter value β. From this graph, it can be seen that the 3T-land jitter characteristics can be improved by making the target pit depth parameter value β smaller as the recording speed is increased. In Table 6 below, there is shown an optimum range of the target pit depth parameter value β for the various recording speeds, which is applicable to both of the cyanine-based and phthalocyanine-based optical disks.

TABLE 6

| | STANDARD SPEED | DOUBLE SPEED | FOUR-TIMES SPEED | SIX-TIMES SPEED | EIGHT-TIMES SPEED |
|---|---|---|---|---|---|
| TARGET DEPTH PARAMETER | 4~18% | 2~16% | 0~12% | −2~10% | −4~8% |

Because the target pit depth parameter β relates to a recorded pit depth that varies in accordance with the irradiated recording laser power, the target pit depth parameter value β can be controlled by controlling the recording laser power (top power) Pt. Namely, the target pit depth parameter value β can be made greater by increasing the recording laser power Pt and can be made smaller by decreasing the recording laser power Pt. Therefore, no matter which recording speed is employed, the jitter characteristics can be improved with a minimized waveform distortion of the reproduced signals, by predetermining such a level of the recording laser power Pt as to attain an optimum target pit depth parameter β (FIG. 6) and controlling the thus-predetermined recording laser power level Pt in accordance with the selected recording speed.

Figure 21:
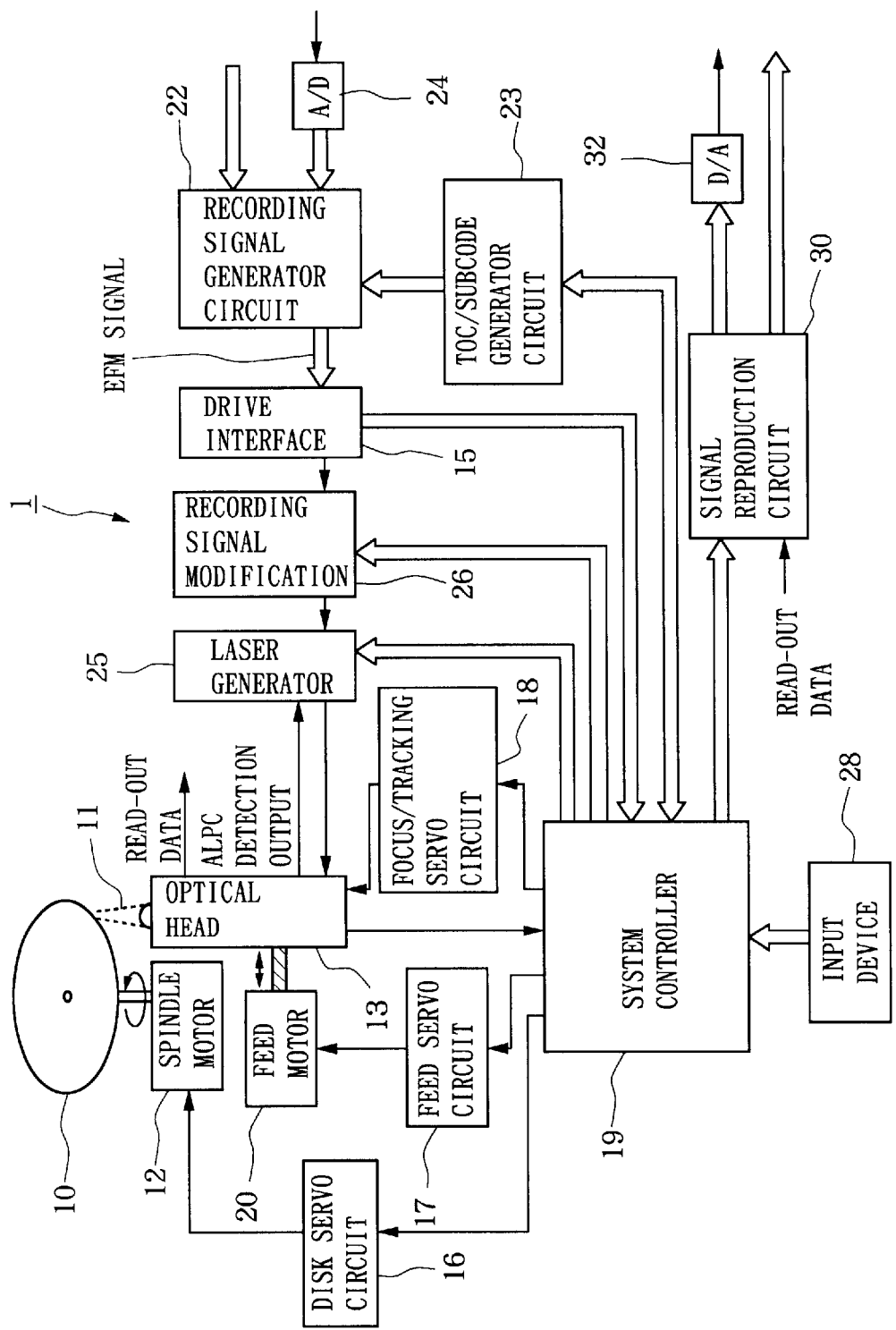
FIG. 21 is a block diagram showing an exemplary overall system organization of an optical disk recording apparatus to which the principle of the present invention is applied.

Now, a description will be made about the optical disk recording apparatus in accordance with a preferred embodiment of the present invention with reference to FIGS. 21 and 1. FIG. 21 is a block diagram showing an exemplary overall system organization of the optical disk recording apparatus 1. Input device 28 is provided for a user or human operator to selectively set a desired recording speed. In accordance with an instruction from a system controller 19, a disk servo circuit 16 controls a spindle motor 12 to rotate at a constant linear velocity at the selected recording speed; that is, the spindle motor 12 is driven at a linear velocity of 1.2 m/s–1.4 m/s when the standard recording speed is selected (hereinafter "standard linear velocity"), twice as fast as the standard linear velocity when the two-times or double recording speed is selected, four times as fast as the standard linear velocity when the four-times recording speed is selected, six times as fast as the standard linear velocity when the six-times recording speed is selected, and eight times as fast as the standard linear velocity when the eight-times recording speed is selected. The Orange Book standard prescribes that the "pre-groove wobble" fall at 22.05 kHz, so that the constant linear velocity can be realized by detecting the wobble from an output signal from an optical head 13 (e.g., from a residual component of a tracking signal) and PLL (Phase-Locked Loop)-controlling the spindle motor 12 in such a manner that the detected wobble falls at a predetermined frequency, i.e., 22.05 kHz at the standard recording seed, 44.1 kHz at the double recording speed, 88.2 kHz at the four-times recording speed, 132.3 kHz at the six-times recording speed, 176.4 kHz at the eight-times recording speed, etc.

Focus servo/tracking servo circuit 18 performs focus and tracking control on a laser light beam emitted by a semiconductor laser provided within the optical head 13, in accordance with an instruction given from the system controller 19. Here, the tracking control is effected by detecting a pre-groove formed in the optical disk 10. Further, a feed servo circuit 17 drives a feed motor 20 to move the optical disk 10 along the radius of the optical disk, in accordance with an instruction given from the system controller 19.

At a rate corresponding to the selected recording speed, individual signals or data to be recorded on the optical disk 10 (in this case, CD-WO disk commonly called "CD-R") are introduced directly into a recording signal generator circuit 22 at a rate corresponding to the selected recording speed if it is in digital form, but they are introduced into the recording signal generator circuit 22 via an A/D converter 24 if it is in analog form. The recording signal generator circuit 22 interleaves the input data with necessary error check codes and imparts to the input data TOC (Table-Of-Content) information and subcode information generated by a TOC/subcode generator circuit 23. Then, the recording signal generator circuit 22 subjects the interleaved input data to an EFM modulation to form a series of data in a CD-standard format and at a transfer rate corresponding to the selected recording speed and outputs the resulting data as a recording signal.

The recording signal thus output from the generator circuit 22 is then passed via a drive interface 15 to a recording signal modification circuit 26 where the signal is subjected to a further modulation as dictated by a recording strategy corresponding to the disk type (dye material used in the disk's recording layer, disk manufacturer, etc.), linear velocity and selected recording speed. The thus-modulated recording signal from the modification circuit 26 is delivered to a laser generator circuit 25, which drives the semiconductor within the optical head 13 to irradiate a laser light beam onto the recording surface of the optical disk 10 for formation of desired pits. The laser power irradiation from the semiconductor is set to a specified level corresponding to the selected recording speed and, if necessary, to the liner velocity, and it is further controlled by an ALPC (Automatic Laser Power Control) circuit to precisely assume the specified level. In this manner, the desired data are recorded on the optical disk 10 in the CD standard format at the transfer rate and at the linear velocity of 1.2 m/s–1.4 m/s. Whereas the target pit depth parameter $\beta$ is made smaller in value as the recording speed is increased, the recording-laser-power level itself is made higher with the recording speed increase.

Subsequently, as a reproducing laser light beam is irradiated onto the optical disk 10 having the data recorded in the above-described manner, the recorded data are read out from the disk 10 to be demodulated by a signal reproduction circuit 30 and then output directly in digital form or after being converted into analog representation by a D/A converter 31.

Figure 1:
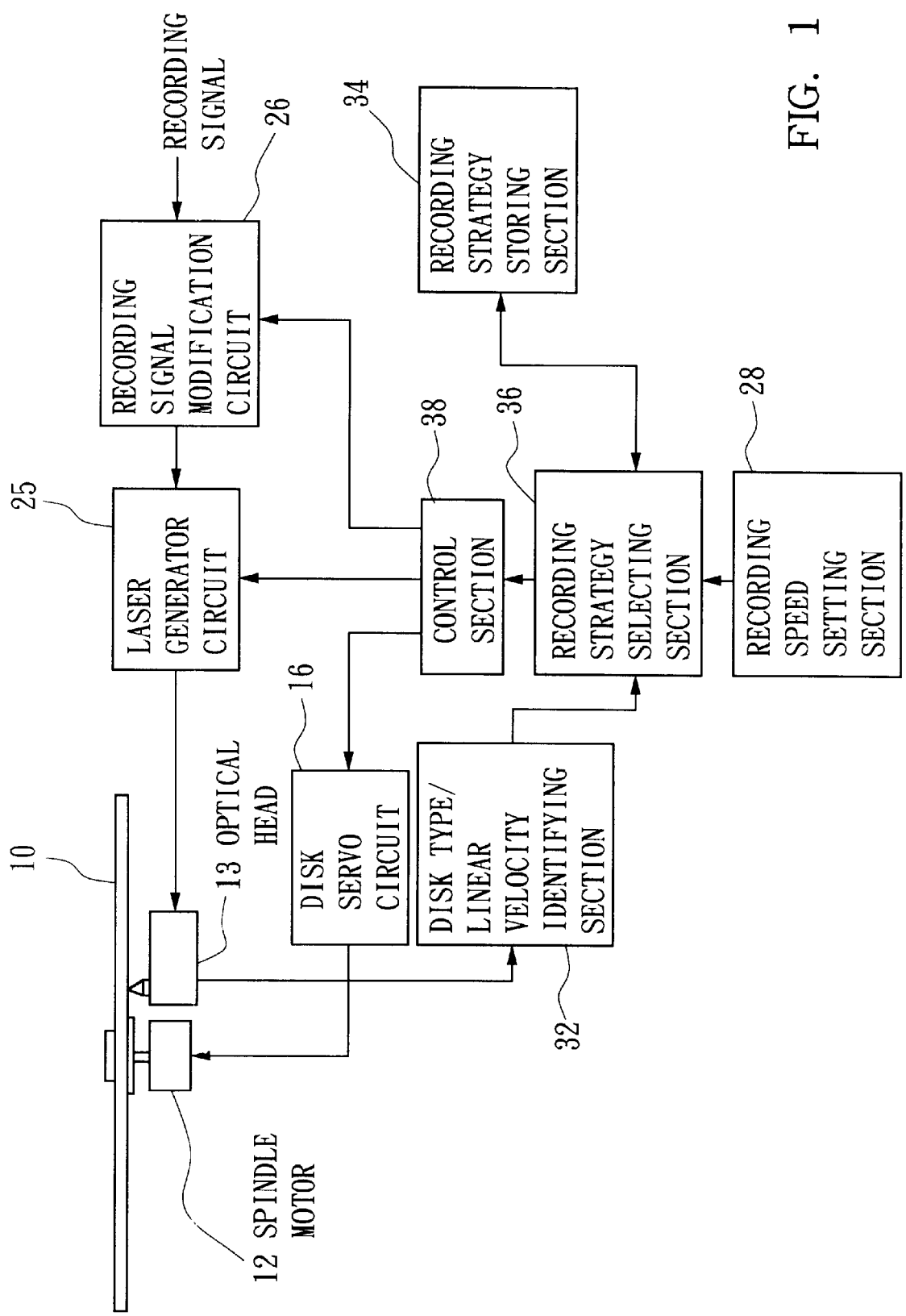
FIG. 1 is a block diagram explanatory of various control performed by a system controller in a preferred embodiment of the present invention.

Further, FIG. 1 is a block diagram explanatory of various control performed by the system controller 19 of FIG. 21. In FIG. 1, a recording speed setting section 28 corresponds to the input device 28 of FIG. 21, which sets a recording speed (x1, x2, x4, x6, x8 , . . . ) selected by the human operator. Disk type/linear velocity identifying section 32 identifies a type and linear velocity of the optical disk 10 installed in the optical recording apparatus. The disk type can be identified, for example, from disk type information included in various pieces of ID information pre-recorded on the optical disk 10; alternatively, disk-type selecting switches may be provided so that information representative of the disk type may be entered manually by the user selectively manipulating any of these switches. The linear velocity can be identified by reading out a recording time (63 minutes, 74 minutes or another time between these) registered, for example, as part of the ATIP signal in the disk's lead-in area and then determining a linear velocity corresponding to the recording time (1.4 m/s for the 63-minute type, or 1.2 m/s for the 74-minute type), or from an encoder output of the spindle motor.

Further, in FIG. 1, a recording strategy storing section 34 has prestored therein various recording strategies (time variation patterns, recording laser power levels, etc.) each for generating recording pulses of FIG. 2 in settings as dictated by any one of Tables 1–5 above and in accordance with a combination of the disk type, linear velocity and selected recording speed. In this recording strategy storing section 34, there are also prestored optimum target pit depth parameter values $\beta$ (corresponding to those of Table 6) which become smaller as the recording speed is increased. Recording strategy selecting section 36 reads out, from the storing section 34, one of the recording strategies which corresponds to the disk type, linear velocity and selected recording speed input to or detected by the optical disk recording apparatus. In accordance with the read-out recording strategy, a control section 38 controls the recording signal modification circuit 26 to modulate the respective lengths of pit-forming and land forming segments of the recording signal. The control section 38 also carries out the so-called OPC control to calculate recording laser power levels capable of achieving the optimum target pit depth parameters $\beta$ determined for the individual recording speeds and store these calculated recording laser power levels in memory as target recording laser power values. In actual recording, the control section 38 controls the laser generator circuit 25 so as to set the recording laser power irradiation to the target recording laser power value predetermined for the selected recording speed. The control section 38 also controls the disk servo circuit 16 so that the spindle motor 12 is set to the rotation speed corresponding to the selected recording speed. In the above-described manner, desired recording is performed on the optical disk 10. Note that others details than the above-mentioned are set in accordance with the standard of Orange Book II, Vol. 3.0.

What is claimed is:

1. An optical disk recording apparatus capable of recording on both a cyanine-based optical disk and a phthalocyanine-based optical disk at a variably selected recording speed, said optical disk recording apparatus comprising:

a control section that, in accordance with a length of a pit to be recorded, controls a laser power irradiation time to have a length of $$(n-K)T+\Delta 3T,$$

where nT represents the length of a pit to be formed, n represents a mark length, T represents a clock period, K is a constant and $\Delta 3T$ represents an extra laser power value for addition to recording of a 3T pit, said control section also performing control for imparting an additional top power pulse to an initial part of each pit-forming laser power irradiation so as to increase a level of the laser power over a standard recording power level temporarily for a predetermined time period, wherein said control section performs further control for changing values of the K and Δ3T and a level of the additional top power pulse in accordance with information representative of a disk type and selected recording speed that is input to or detected via said optical disk recording apparatus, in such a way that the K is set to a value in a range of 0.1 to 0.25 and the Δ3T is set to a value in the range of 0.05T to 0.15T for recording on the cyanine-based optical disk at six-times recording speed, and that, for recording on the phthalocyanine-based optical disk at the six-times recording speed, the K is set to a value in a range of 0.1 to 0.25 and the additional top power pulse is set to a width of 1.25T and a level substantially equal to 10%–20% of a level difference between top laser power and bottom laser power used in the recording so as to achieve a predetermined laser power irradiation or set to another width and level capable of achieving laser power irradiation similar to said predetermined laser power.

2. An optical disk recording apparatus capable of recording on both a cyanine-based optical disk and a phthalocyanine-based optical disk at a variably selected recording speed, said optical disk recording apparatus comprising:

a control device that, in accordance with a length of a pit to be recorded, controls a laser power irradiation time to have a length of $(n-K)T+\Delta 3T$, where nT represents the length of a pit to be formed, n represents a mark length, T represents a clock period, K is a constant and Δ3T represents an extra laser power value for addition to recording of a 3T pit, said control device also performing control for imparting an additional top power pulse to an initial part of each pit-forming laser power irradiation so as to increase a level of the laser power over a standard recording power level temporarily for a predetermined time period, wherein said control device performs further control for changing values of the K and Δ3T and a level of the additional top power pulse in accordance with information representative of a disk type and selected recording speed that is input to or detected via said optical disk recording apparatus, in such a way that, for recording on the cyanine-based optical disk at an eight-times recording speed, the K is set to a value in a range of −0.1 to 0.1 and the additional top power pulse is set to a width of 1.25T and a level substantially equal to 15%–25% of a level difference between top laser power and bottom laser power used in the recording so as to achieve a predetermined laser power irradiation or set to another width and level capable of achieving laser power irradiation similar to said predetermined laser power irradiation, and that, for recording on the phthalocyanine-based optical disk at the eight-times recording speed, the K is set to a value in a range of 0 to 0.2 and the additional top power pulse is set to a width of 1.25T and a level substantially equal to 15%–25% of the level difference between top laser power and bottom laser power used in the recording so as to achieve a predetermined laser power irradiation or set to another width and level capable of achieving laser power irradiation similar to said predetermined laser power irradiation.

3. An optical disk recording apparatus capable of recording on both a cyanine-based optical disk and a phthalocyanine-based optical disk at a variably selected recording speed, said optical disk recording apparatus comprising a control section that, in accordance with a length of a pit to be recorded, controls a laser power irradiation time to have a length of $(n-K)T+\Delta 3T$, where nT represents the length of a pit to be formed, n represents a mark length, T represents a clock period, K is a constant and Δ3T represents an extra laser power value for addition to recording of a 3T pit, said control section also performing control for imparting an additional top power pulse to an initial part of each pit-forming laser power irradiation so as to increase a level of the laser power over a standard recording power level temporarily for a predetermined time period, wherein said control section performs further control for changing values of the K and Δ3T and a level of the additional top power pulse in accordance with information representative of a disk type and selected recording speed that is input to or detected via said optical disk recording apparatus, in such a way that the K is set to a value in a range of 1.0 to 1.4 and the Δ3T is set to a value in a range of 0.25T to 0.35T for recording on the cyanine-based optical disk at the standard recording speed, while the K is set to a value in a range of 0.8 to 1.2 and the Δ3T is set to a value in a range of 0.05T to 0.15T for recording on the phthalocyanine-based optical disk at the standard recording speed that the K is set to a value in a range of 0.6 to 0.9 and the Δ3T is set to a value in a range of 0.15T to 0.25T for recording on the cyanine-based optical disk at a double recording speed, while the K is set to a value in a range of 0.8 to 1.2 and the Δ3T is set to a value in a range of 0.1T to 0.2T for recording on the phthalocyanine-based optical disk at the double recording speed, that the K is set to a value in a range of 0.1 to 0.25 and the Δ3T is set to a value in a range of 0.05T to 0.15T for recording on the cyanine-based optical disk at a six-times recording speed, and, for recording on the phthalocyanine-based optical disk at the six-times recording speed, the K is set to a value in a range of 0.1 to 0.25 and the additional top power pulse is set to a width of 1.25T and a level substantially equal to 10%–20% of a level difference between top laser power and bottom laser power used in the recording so as to achieve a predetermined laser power irradiation or set to another width and level capable of achieving laser power irradiation similar to said predetermined laser power irradiation, and that for recording on the cyanine-based optical disk at an eight-times recording speed, the K is set to a value in a range of −0.1 to 0.1 and the additional top power pulse is set to a width of 1.25T and a level substantially equal to 15%–25% of a level difference between top laser power and bottom laser power used in the recording so as to achieve a predetermined laser power irradiation or set to another width and level capable of achieving laser power irradiation similar to said predetermined laser power radiation, while, for recording on the phthalocyanine-based optical disk at the eight-times recording speed, the K is set to a value in a range of 0 to 0.2 and the additional top power pulse is set to a width of 1.25T and a level substantially equal to 15%–25% of the level difference between top laser power and bottom laser power used in the recording so as to achieve a predetermined laser power irradiation or set to another width and level capable of achieving laser power irradiation similar to said predetermined laser power irradiation.

4. An optical disk recording apparatus capable of recording on an optical disk at a variably selected recording speed, said optical disk recording apparatus comprising:

a control section that controls a recording laser power level in such a manner that the recording laser power level is made higher as the recording speed is increased and a target pit depth parameter, representative of a target value of a pit depth to be formed in the optical disk, is made smaller in value as the recording speed is increased.

5. A method of recording on an optical disk capable of recording on an optical disk at a variably selected recording speed, comprising:

providing the optical disk for recording; and controlling a recording laser power level in such a manner that the recording laser power level is made higher as the recording speed is increased and a target pit depth parameter, representative of a target value of a pit depth to be formed in the optical disk, is made smaller in value as the recording speed is increased.

6. The optical disk recording apparatus according to claim 4, wherein the optical disk is a write-once optical disk.

7. The method according to claim 5, wherein the optical disk is a write-once optical disk.

* * * * *